(No Model.)

P. PUTNAM & A. G. SARGENT.
APPARATUS FOR HEATING FREIGHT CARS.

No. 464,254. Patented Dec. 1, 1891.

WITNESSES.

INVENTOR.

UNITED STATES PATENT OFFICE.

PERLEY PUTNAM, OF LACONIA, AND ARTHUR G. SARGENT, OF EAST TILTON, NEW HAMPSHIRE.

APPARATUS FOR HEATING FREIGHT-CARS.

SPECIFICATION forming part of Letters Patent No. 464,254, dated December 1, 1891.

Application filed January 3, 1891. Serial No. 376,595. (No model.)

*To all whom it may concern:*

Be it known that we, PERLEY PUTNAM, of Laconia, and ARTHUR G. SARGENT, of East Tilton, in the county of Belknap and State of New Hampshire, have invented certain new and useful Improvements in Apparatus for Heating Freight-Cars, of which the following is a specification.

This invention relates to freight-cars which are heated sufficiently to prevent the freezing of freight in cold weather. It is desirable to maintain a uniform and very moderate degree of heat in freight-cars, so as to avoid injury to the contents either by extremes of heat or cold.

Various forms of heating apparatus have been devised and put into use for maintaining a moderate degree of heat in a freight-car; but in all apparatuses heretofore devised, so far as we are aware, the construction has been complicated and the results more or less unsatisfactory, owing in part to the complication of the apparatus and its consequent liability to derangement.

Our invention has for its object to provide a simple and efficient means for heating freight-cars without liability to either overheat the car or to insufficiently warm the same by derangement of the working parts of the apparatus.

Our invention consists, mainly, in the combination, with a freight-car, of a partition within the same separating a small compartment from the main portion or storage-compartment of the car, a heater in said small compartment, a valve arranged to cover an opening in said partition, said opening constituting the only means for the passage of heated air from the heating to the storage compartment, and a thermostatic regulator located in the storage-compartment and connected with said valve, the arrangement being such that the position of the valve is governed by the temperature in the storage-compartment, the valve being opened when the temperature falls below a predetermined degree, thus admitting heated air from the heating-compartment, and closed when the temperature rises above said predetermined degree, thus shutting off the communication between the heating and storage compartments until the temperature in the latter is sufficiently reduced, all of which we will now proceed to describe.

Figure 2:
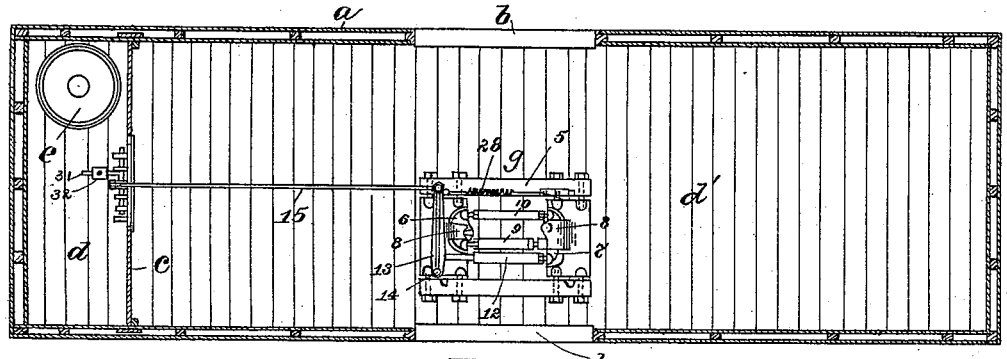
Figure 1:
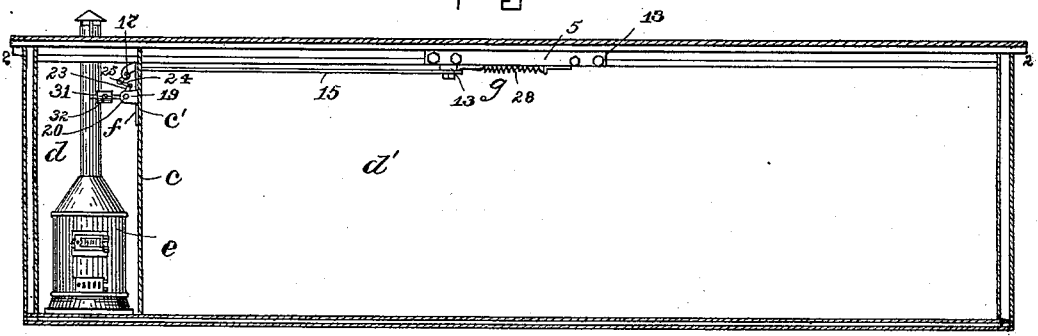
Figure 3:
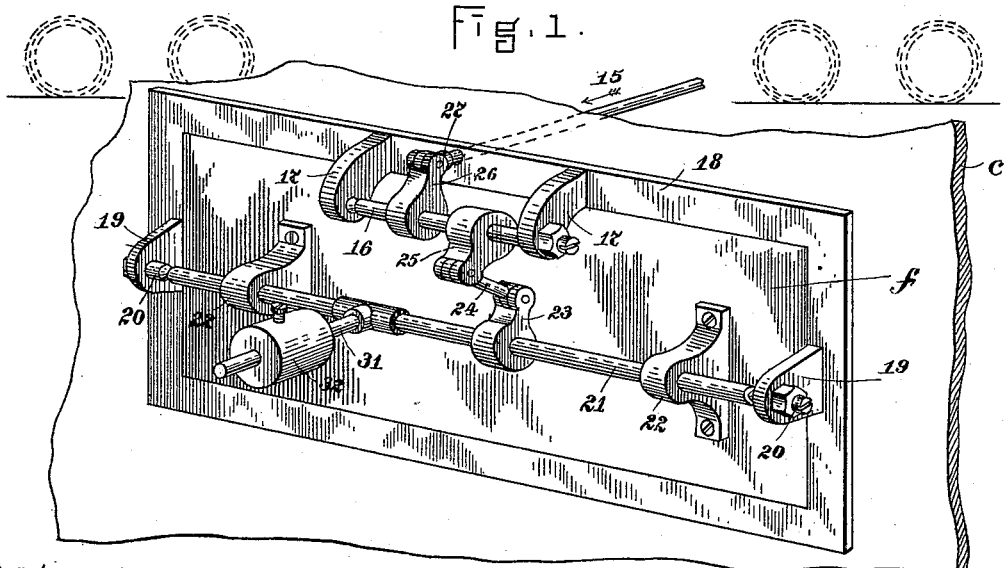

In the accompanying drawings, Figure 1 represents a longitudinal vertical section of a freight-car provided with our improvements. Fig. 2 represents a section on line 2 2, Fig. 1, looking downward. Fig. 3 represents a perspective view of a portion of the partition which separates the heating from the storage compartment and the valve and a portion of the mechanism that operates the same.

The same letters and numerals of reference indicate the same parts in all the figures.

In the drawings, $a$ represents the body of a freight-car, and $b\,b$, Fig. 2, represent the usual side doors thereof.

$c$ represents a transverse partition extending across the car near one end thereof and dividing the car into two compartments $d\,d'$ of different sizes. The compartment $d$ is of sufficient size to contain a heater $e$, which may be a stove of any suitable construction or a steam-heater or any other suitable means of diffusing heat. The larger compartment $d'$ is the main storage-compartment of the car. The partition $c$ has an opening at $c'$, which constitutes the only communication between the two compartments $d$ and $d'$.

$f$ represents a valve, which is pivotally connected to the partition $c$ and is capable of being turned upon its pivots so as to either uncover the opening $c'$ to any desired extent or to entirely close said opening. When the valve is closed, there can be no movement of heated air from the heating-compartment $d$ into the storage-compartment; but when said valve is opened the heated air can pass from the heating-compartment to the storage-compartment.

In the upper portion of the storage-compartment and arranged, preferably, near the center thereof is a thermostat $g$, which is preferably constructed as shown in Letters Patent of the United States granted to Arthur G. Sargent of December 3, 1889, No. 416,503. Said thermostat is composed of a frame 5, which is suitably attached to the roof or other portion of the car, the levers 6 7, mounted to oscillate on bearings 8 8 on the frame, and expansion rods or members 9 10 12, which are adapted to be expanded and contracted by variations of temperature. The rod 9 bears at one end on a fixed support on the frame 5 and at the other end on the shorter arm of the lever 6. The rod 10 bears at one end on the longer arm of the lever 6 and at the other end on the shorter arm of the lever 7. The rod 12 bears at one end on the longer arm of the lever 7 and at the other end on a lever 13, which is pivoted at 14 to the frame 5. The swinging end of said lever 13 is connected by a rod 15 with devices that open and close the valve $f$. Said devices include a rock-shaft 16, which is mounted upon centers attached to ears 17 17 on a frame 18, attached to the partition $c$, the valve $f$ being pivotally connected to ears 19 19 on said frame by means of centers 20, attached to said ears and engaged with the ends of a rod 21, affixed to ears or brackets 22 22 on the valve $f$. The rod 21 is provided with an arm 23, which is connected by a rod 24 with an arm 25 on the rock-shaft 16. Said rock-shaft has an arm 26, to which is pivotally connected the rod 15, that is connected to the lever 13 of the thermostat, said rod 15 passing through an orifice 27 in the frame 18. It will be seen that when the thermostat-lever 13 is moved in the direction required to move the rod 15 in the direction indicated by the arrow it will close the valve $f$ through the arm 26, rock-shaft 16, arm 25, rod 24, arm 23, and rod 21. The rod 15 is moved in the direction described by the expansion of the members 9 10 12 of the thermostat, said members acting on the lever 13 in a manner described in the above-mentioned patent. The parts are so adjusted that a given expansion of the members of the thermostat will entirely close the valve $f$, thus shutting off the supply of heat from the storage-compartment. When the temperature falls sufficiently, the contraction of the members of the thermostat permits a spring 28, connected at one end to the lever 13 and at the other end to the frame 5, to draw said lever in a direction opposite to that indicated as above, and thus open the valve $f$ through the rod 15 and other valve-operating devices to an extent which is determined by the contraction of the members of the thermostat, so that hot air is again permitted to enter the storage chamber or compartment.

To facilitate the opening of the valve by the action of the spring 28, we provide the rod 21 on the valve with an arm 31, provided with a weight 32, the normal tendency of which is to open the valve, so that when the members of the thermostat contract the weight will supplement the spring 28 in opening the valve. The weight 32 is adjustable, so that it may be caused to exert more or less force on the valve. Hence the weight may be adjusted to the power which operates the valve.

It will be seen that by arranging the heater at one end of the car in a compartment separate from the storage-compartment and providing a valve controlled by a thermostat in said storage-compartment to control the passage of heat from the heater to the storage-compartment we are enabled to readily and cheaply fit up an ordinary freight-car as a heating-car, it being necessary only to build the partition and apply the thermostat and valve to the car. It will also be seen that the valve in the partition is adapted to be operated by a simple thermostatic arrangement without the employment of complicated and delicate parts. Hence the apparatus can be readily kept in order and is not liable to derangement and failure to operate.

We do not limit ourselves to the particular construction of the thermostat and of the valve and its operating devices above described nor to the particular arrangement of the devices connecting the rock-shaft 16 with the valve $f$; but it is to be understood that when the valve is pivoted at one side of its center, as shown in Fig. 3, it is necessary to have the opening in the partition of such width or to bevel the top or bottom edge thereof so as to permit the valve to swing freely.

We claim—

1. The combination, with a freight-car or other like receptacle, of a partition extending across the car and subdividing its interior into a smaller or heating compartment, said partition having an opening, a heater in said smaller compartment, a valve arranged in the said opening, a thermostat in the storage-compartment, and direct rigid connections between the said thermostat and valve, whereby the valve is closed by an increase and opened by a decrease of temperature in the storage-compartment, as set forth.

2. The combination of a freight-car or other like receptacle having a partition subdividing its interior into a smaller or heating compartment and a larger or storage compartment, a heater in said smaller compartment, a pivoted or hinged valve controlling an opening in said partition, a thermostat having an operating-lever in said storage-compartment, and direct rigid connections between said lever and the valve, as set forth.

3. The combination of the frame 18, constituting the margin of an opening and provided with ears 17 17 and 19 19, the valve having a rod 21 pivotally connected to the ears 19 19, a rock-shaft pivotally connected with the ears 17 17 and provided with an arm 26, whereby it may be oscillated, and connections between said rock-shaft and rod through which the valve may be moved, as set forth.

4. The combination of the partition having an opening, the valve pivoted in said opening and provided with an arm 23, a rock-shaft 16, supported by fixed bearings on the partition and provided with two arms 25 and 26, a rod 24, connecting the arm 25 with the arm 23 on the valve, a thermostat having an operating-lever, and a rod 15, connecting said lever with the arm 26, as set forth.

In testimony whereof we have signed our names to this specification, in the presence of two subscribing witnesses, this 10th day of December, A. D. 1890.

PERLEY PUTNAM.
   ARTHUR G. SARGENT.

Witnesses:
 S. S. JEWETT,
 A. L. JEWETT.